Feb. 21, 1939.   S. G. BAITS   2,147,955
VEHICLE BRAKE MECHANISM
Filed Sept. 17, 1935   4 Sheets-Sheet 1
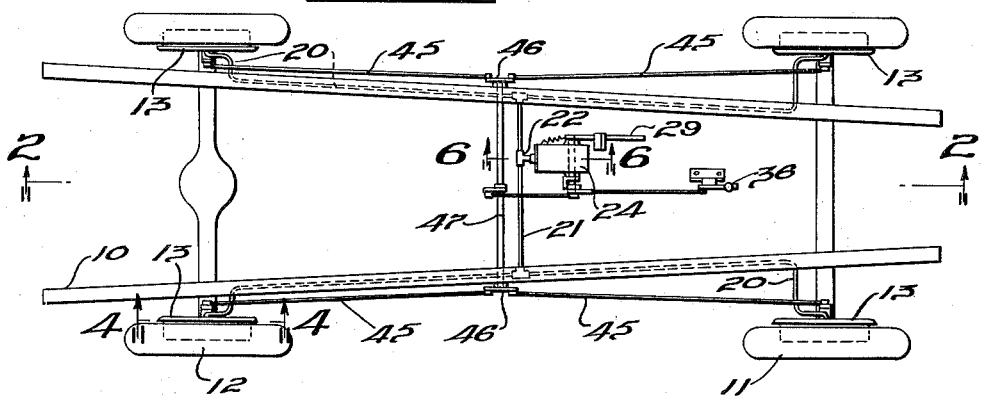
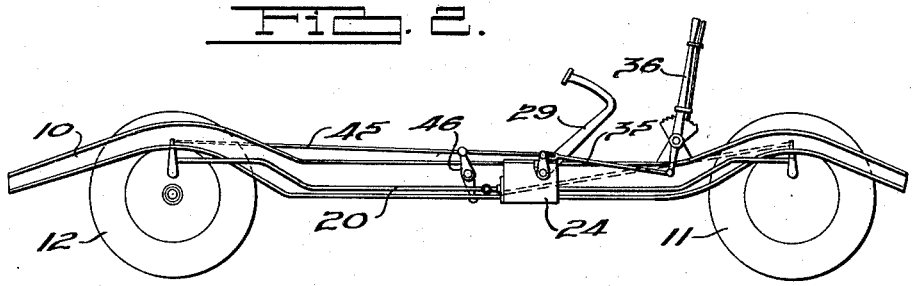
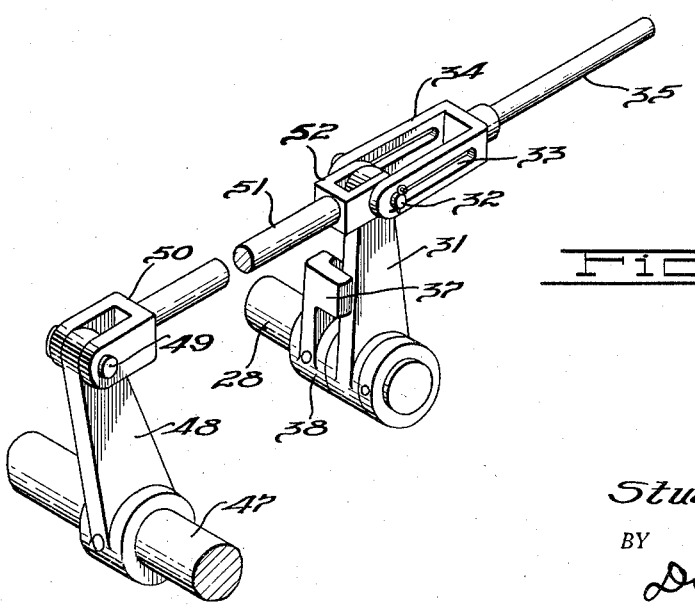
INVENTOR.
Stuart G. Baits.
BY
Dike, Calvert & Gray
ATTORNEYS.

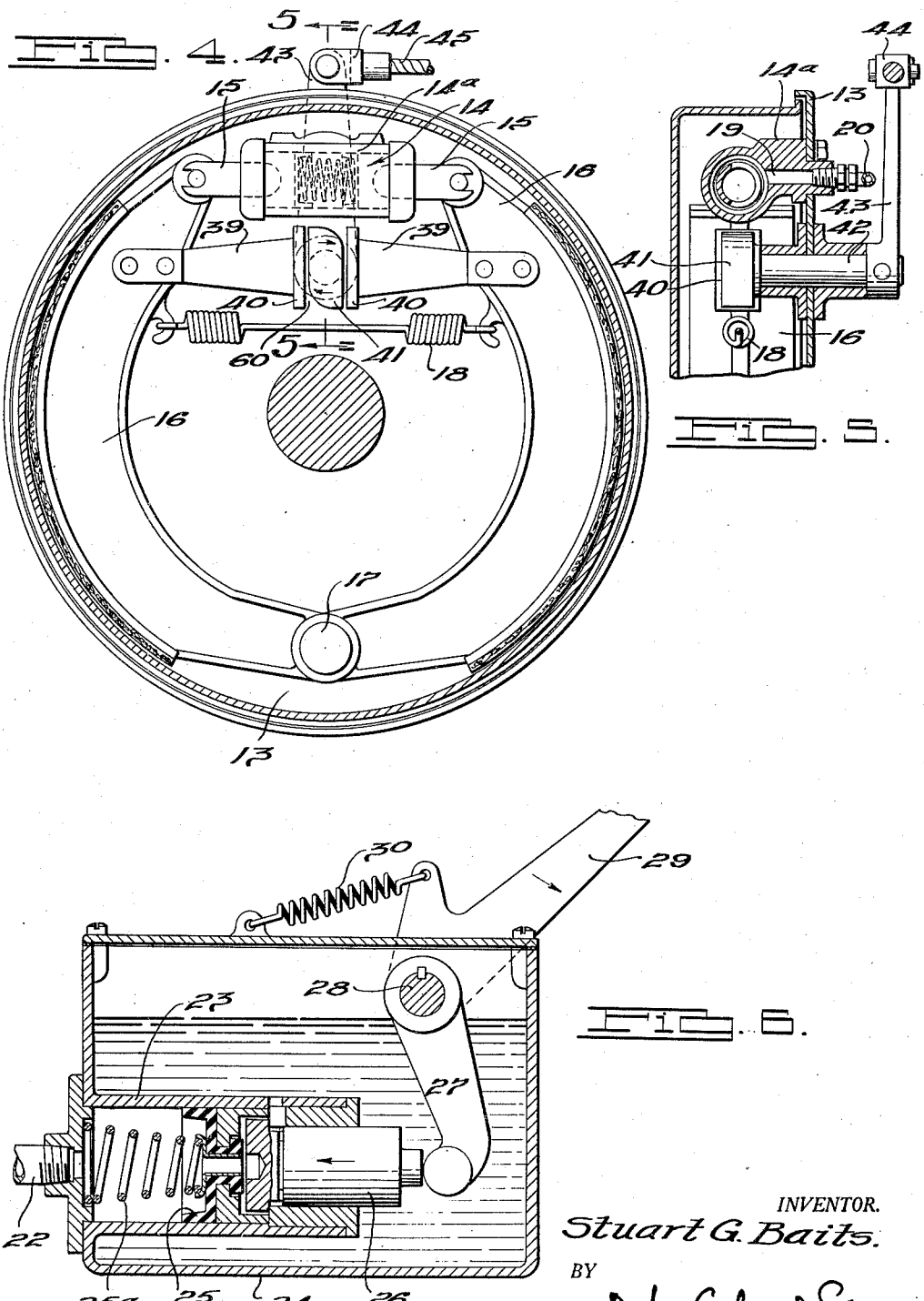

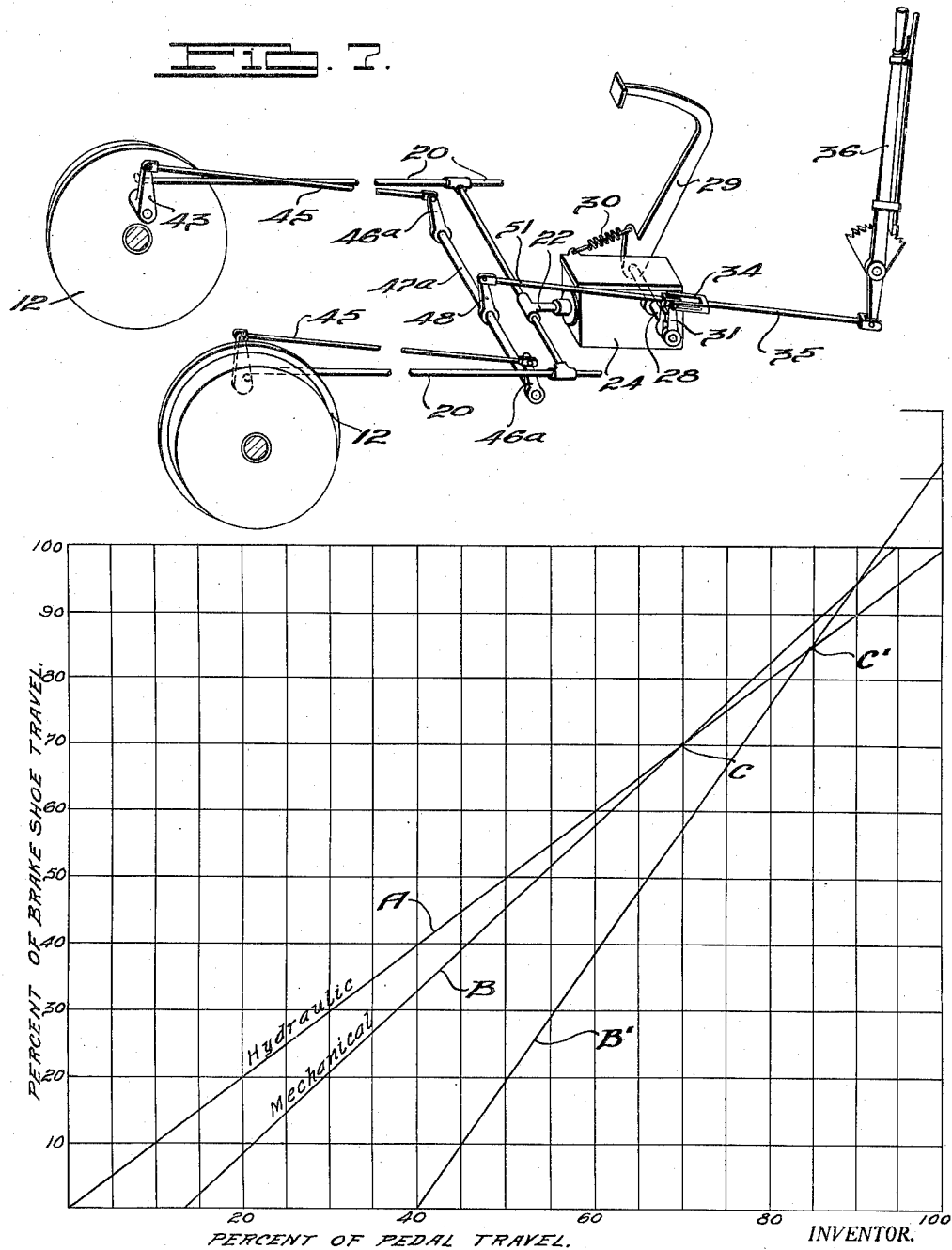

Feb. 21, 1939.    S. G. BAITS    2,147,955
VEHICLE BRAKE MECHANISM
Filed Sept. 17, 1935    4 Sheets—Sheet 4
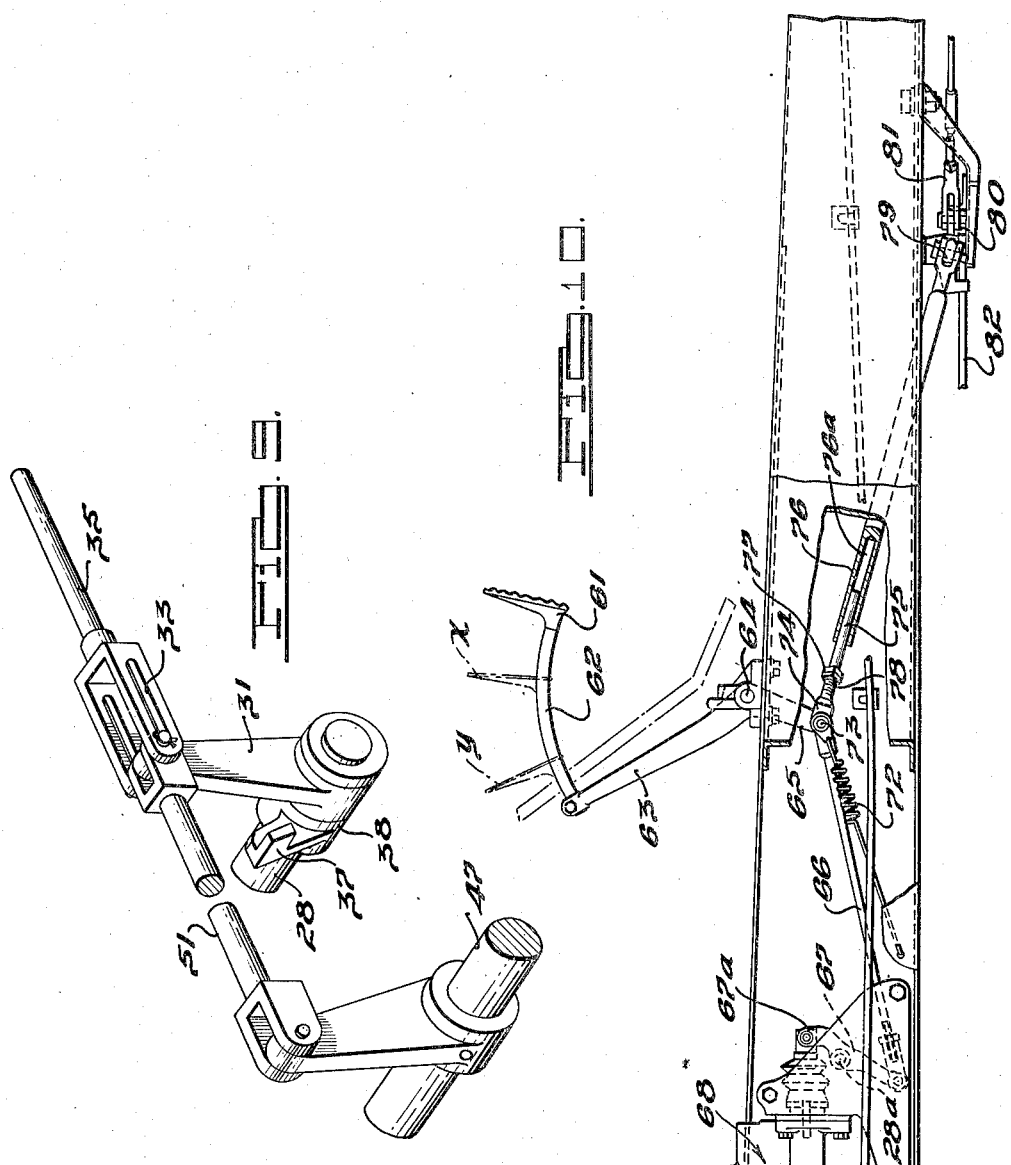
INVENTOR.
Stuart G. Baits.
BY
Dike, Calver & Gray
ATTORNEYS.

Patented Feb. 21, 1939

2,147,955

UNITED STATES PATENT OFFICE 2,147,955

VEHICLE BRAKE MECHANISM

Stuart G. Baits, Grosse Pointe, Mich., assignor to Hudson Motor Car Company, Detroit, Mich., a corporation of Michigan Application September 17, 1935, Serial No. 40,957

14 Claims. (Cl. 188—106)

This invention relates to brake mechanism for vehicles, particularly automotive vehicles, and has for one of its objects the provision of a compound braking system utilizing both hydraulic and mechanical means for applying the brakes to the wheels of the vehicle, the improved construction being such as to ensure at all times maximum efficiency as well as safety in the operation of the system.

A further object of the invention is to provide a hydraulic braking system for vehicle wheels having incorporated therein a safety mechanical brake auxiliary or supplementary to the main hydraulic mechanism and functioning preferably simultaneously therewith but controlled in such a manner as to effect positive action of the wheel brakes only at a predetermined time or in the event of the failure of the hydraulically operated mechanism.

A further object of the invention is to provide a vehicle brake mechanism with a single manual control or foot pedal for actuating the same, and two independent systems under said control for actuating said mechanism either sequentially or independently of each other, one comprising hydraulically controlled means and the other mechanically controlled means.

A still further object of the invention is to provide a compound hydraulically and mechanically actuated brake mechanism of the foregoing character embodying on the one hand a wheel cylinder with pistons actuating the brake shoe or shoes, and on the other hand a separate cam device or the like for actuating said shoe or shoes, a single manual or foot control being utilized for operating both said pistons and said cam device simultaneously and substantially throughout the range of pedal movement, the arrangement and design of the cam device, however, being such that it has a differential action with respect to the action of the hydraulic device, as a consequence of which the mechanical actuating device for the brake is ineffective during a predetermined initial range of pedal movement, whereas during a final range of pedal movement the braking action is effected principally or entirely by the mechanical device.

Other objects of this invention will appear in the following description and appended claims, reference being had to the accompanying drawings forming a part of this specification wherein like reference characters designate corresponding parts in the several views.

Fig. 1 is a plan view of an automobile chassis provided with a braking system in accordance with the present invention.

Fig. 2 is a side elevation of the structure shown in Fig. 1.

Fig. 3 is an enlarged fragmentary perspective view of a part of the mechanism.

Fig. 4 is a sectional side elevation illustrating the wheel brake and actuating mechanism therefor.

Fig. 5 is a detail section taken through lines 5—5 of Fig. 4 in the direction of the arrows.

Fig. 6 is an enlarged section taken through lines 6—6 of Fig. 1 in the direction of the arrows.

Fig. 7 is a perspective view of a slight modification.

Fig. 8 is a graph showing the relative action of the hydraulic and mechanical systems.

Fig. 9 is an enlarged fragmentary perspective view of a part of the mechanism.

Fig. 10 is an enlarged fragmentary elevation of a part of the mechanism showing a portion of the brake controlling mechanism.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated by way of example one adaptation of the invention embodying a compound braking system comprised of a hydraulically actuated means for actuating the wheel brakes and a supplementary or auxiliary mechanical means for actuating certain or all of the wheel brakes in case of emergency. In the present preferred system the hydraulic brake mechanism is designed as the service brake and the mechanical hook-up is designed for the purpose of providing a safety brake in the event the hydraulic system should fail.

In Fig. 1 there is illustrated a suitable vehicle chassis 10 having front wheels 11 and rear wheels 12, each provided with a brake drum 13 of any conventional type. As illustrated in Fig. 4, the wheel brake mechanism comprises a wheel cylinder 14 having hydraulically actuated pistons 14a of conventional character which, through connections 15, are adapted to actuate a pair of brake shoes 16. In the present instance two brake shoes are illustrated which are connected by means of an anchor pin 17. It is understood that any suitable brake shoe means may be utilized, such as a single shoe brake if desired. The shoes 16 are connected by means of a return spring 18 for withdrawing the shoes from the brake drum. It will be understood that protractile movement of the pistons 14a in the wheel cylinder will effect engagement of the brake shoes with the drum as is well known in the art.

Each of the wheel cylinders 14 may be provided with a boss 14a provided with an oil or fluid passage 19 to which is connected an oil or other fluid conduit 20 leading to a transverse header conduit 21, see Fig. 1. A main conduit 22 communicates with the conduit or pipe 21 and leads to the master cylinder 23, as illustrated in Fig. 6. The master cylinder is suitably located within a casing 24 providing a reservoir for oil or other fluid medium for actuating the hydraulic mechanism. Within the master cylinder 23 is located a master piston 25 of any suitable construction which is propelled forwardly against the action of a return spring 25a by means of a plunger 26 which is engaged by the lower end of a piston lever 27 keyed at its upper end to a rockshaft 28 extending through the reservoir casing 24. At one end of the rockshaft 28, exteriorly of the casing 24, is connected a manually operable lever 29 which is herein termed the foot pedal, this lever being moved into normal retracted position by means of a return spring 30, see Figs. 1 and 6.

Mounted on the opposite end of the rockshaft 28, exteriorly of the casing 24, is an arm 31, see Fig. 3, this arm being in the present instance loose on the shaft and carrying at its upper end a transverse pin 32 slidingly mounted within a pair of guide slots 33 formed in the bifurcated ends of a coupling 34, this coupling being attached to a cable or rod 35 which extends forwardly and is attached to the lower end of the hand brake lever 36, see Fig. 2. From this construction it will be seen that the arm 31 through its connecting pin 32 has a predetermined degree of lost motion within the coupling 34, thus permitting partial rotation of the arm without actuation of the cable 35 or hand brake 36. The arm 31 may be rocked upon turning the shaft 28 by means of an abutment 37, engaging the arm, and carried by a collar 38 pinned to the shaft. This arm may also be rocked on the shaft by exerting a pull on cable 35 through the hand lever 36 to effect actuation of the mechanical system independently of the hydraulic system.

As previously stated an independent mechanical system is provided for moving the brake shoes 16 into engagement with the brake drum either in the event of failure of the hydraulic system or at any predetermined point in the range of travel of the pedal 29. As illustrated in Fig. 4, a pair of members 39 are attached at their outer ends to the upper ends of the brake shoes 16 adjacent the connections 15. The inner ends of these members terminate in thrust plates 40 providing cam faces which are adapted to be engaged by means of a cam 41 interposed therebetween. The cam 41 is mounted on the inner end of a short shaft 42 journaled in suitable bearings, see Fig. 5, and attached to the outer end of this shaft is an upstanding arm 43. Secured to the upper end of this arm is a coupling 44 to which is attached a cable 45. In the example illustrated in Fig. 1, each wheel brake is provided with a cam actuating mechanism as above described. The actuating cables 45 from the several wheel brakes are extended toward one another and are commonly connected together by means of arms 46 attached to a transverse rockshaft 47. Secured to the shaft 47 is an arm 48 which is connected through a pin 49 and coupling 50 to a rod or cable 51. The latter in turn is connected through a coupling 52 to the pin 32.

From the foregoing it will be seen that upon depressing the pedal 29 the shaft 28 will be rocked thereby. This will result in forcing the plunger and piston 26, 25 of the master cylinder forwardly, thereby creating hydraulic pressure and displacing oil or other fluid in the master cylinder 23 into the main outlet pipe 22. Fluid, therefore, will be forced into the several branch conduits 20 to the several wheel cylinders 14 through the communicating conduits 19. This will propel the pistons 14a outwardly, thereby forcing the shoes 16 into engagement with the brake drum. It will also be seen that rocking of the shaft 28 upon depressing the brake pedal 29 will rock the arm 31 of the mechanical system through the abutment 37. This will effect a pull on the cable or rod 51 and will rock the arm 48 and hence the cross shaft 47, thereby simultaneously pulling the cables 45, rocking the cam shaft actuating arms 43 and turning the several cams 41 relatively to the cam faces 40.

It will be seen by reference to Fig. 4 that in the preferred construction the opposed faces of the cam 41 are normally spaced slightly from the inner working faces of the cam faces of plates 40, these spaces being indicated at 60 in said figure. By means of these clearances 60 it will be readily understood that at least an initial lag can be provided between the operation of the cam means and the operation of the pistons 14a in moving the brake shoes. The levers 29, 27 and 43 may be so proportioned and the cam 41 may be so designed that with a given ratio of movement of the pistons of the master cylinder and the wheel cylinders, the clearance 60 between the cam 41 and the cam faces 40 may be maintained during any predetermined range of travel of the pedal 29. If desired, the slight clearances 60 may be maintained constant by properly designing the cam 41 and the above-mentioned levers. If these clearances are maintained constant throughout the pedal travel, it will be understood that the mechanical means for operating the brake shoes will at all times lag slightly behind the hydraulic means and in the event of failure of the hydraulic system the brakes will be applied through the mechanical mechanism after the foot pedal has travelled sufficiently to take up this lag due to the clearances 60.

It is preferred, however, that the clearances 60 be not constant throughout the pedal travel but that these clearances diminish at a predetermined rate as the foot pedal is depressed and the brake shoes are moved toward the brake drum. Accordingly, therefore, in the present preferred construction the mechanism is designed so that the cam device will have a differential action in respect to the hydraulic device in order to achieve greater safety in the event of failure of the hydraulic system at any point in the range of pedal travel. The comparative action of the hydraulic and mechanical systems is charted graphically in Fig. 8, the line A on the graph indicating the action of the hydraulic system and the line B illustrating the action of the mechanical system in terms of percent of pedal travel and percent of brake shoe travel. With an arrangement such as this it will be seen that due to the clearances 60 the cam will not engage the cam faces until after a certain predetermined travel of the pedal, such as 15% as shown on the graph. The design of the cam and associated parts is such, however, that its effective action is disproportionately varied with respect to the effective action of the hydraulic mechanism and hence the line B on the graph of Fig. 8 intersects the line A at some predetermined point such as at a point C at 70% of the pedal travel. From the intersecting point C during the final 30% of pedal travel, due to the accelerated movement of the cam with respect to the movement of the wheel cylinder pistons, the braking action will be accomplished entirely by means of the mechanical system. In other words, with the illustrated arrangement shown graphically in Fig. 8, the effective braking action will be governed by the hydraulic system until the point C is reached in the pedal travel. At that point the cam, through its accelerated or disproportionate movement, will have caught up with the piston movement and hence at this point, or the locality thereof, the braking action will be accomplished both by the hydraulic and mechanical systems. During continued travel of the pedal, due to the accelerated action of the cam, the principal braking effect will be accomplished through the mechanical system.

Normally where the brake shoes are properly adjusted and the brake shoe lining not worn excessively, the braking action will be accomplished by the hydraulic means and substantially full braking effect for normal conditions will be achieved when the pedal travel has reached the point C on the graph, i. e. approximately 70% of the pedal travel. The cam may, therefore, be designed so as to gradually diminish the clearance spaces 60 during the initial pedal travel, and when the point C has been reached the lag between the cam and the wheel cylinder pistons will have been absorbed. From this point, therefore, due to the differential action of the cam during further pedal travel, the braking action is taken over by the mechanical means due to the disproportionately and increasingly greater force applied to the shoes during each successive increment of travel of the pedal.

Referring to Fig. 7, there is illustrated a somewhat modified mechanical system operable in conjunction with the hydraulic system through the pedal 29. In this instance the mechanical system is applied solely to the rear wheel brakes. In this embodiment the hydraulic system is the same as that previously described. The cross shaft 47a for the mechanical system is, however, connected through arms 46a and cables 45 solely to the cam actuating arms 43 of the rear wheels. The construction otherwise is substantially identical to that previously shown and described and hence when the foot pedal 29 is depressed the mechanical mechanism will actuate the cams 41 mounted in the rear wheel brakes.

Referring to Figs. 8 and 9 it may be desirable to provide an installation in which the mechanical system pick-up occurs later in the pedal travel and then builds up more rapidly than as illustrated by graphical lines A and B. For example, as shown in Fig. 8 there may be a forty percent travel of the pedal and a corresponding idle or lost motion in the mechanical system before actuation of cam 41 commences. Thereafter, however, as a result of appropriate design of the cam the clearance spaces at 60, which will have progressively increased in magnitude during the said initial forty percent travel of the pedal, will be diminished at a disproportionately greater rate as shown by line B', so that beyond the intersecting point C' of lines A and B' the mechanical system will control the braking action.

The foregoing may be accomplished, as shown in Fig. 9, by changing the angularity of abutment arm 37. As there illustrated the arm 31 will remain idle during the initial turning of shaft 28 in a clockwise direction until abutment 37 engages the arm 31 in order to rock the same. This lost motion between abutment 37 and arm 31 may be predetermined as desired, but in the present instance corresponds to the initial forty percent of pedal travel.

A similar relative action of the mechanical and hydraulic systems, such as depicted by the graph lines A and B' of Fig. 8, may be secured through the modified apparatus shown in Fig. 10. In this instance the foot pedal 61 is carried by the arm 62 adjustably connected to the outer end of an arm 63 fixed to cross shaft 64. A depending arm 65 is in turn fixed to the shaft and at its lower end has a common articulated connection through a pin or the like 73 to the mechanical and hydraulic systems. The hydraulic connection comprises a forwardly extending rod 66 adjustably connected to the lower end of a lever 67 pivoted at 28a intermediate its ends, the upper end being connected to a plunger for operating the main piston in the master cylinder, generally designated 68. The master cylinder and piston mechanism may be of the type above described or other conventional type, having its outlet at 69 from which a fluid conduit 70 leads to the front wheel cylinders 14 and a conduit 71 leads to the rear wheel cylinders 14.

The pedal 61 is returned by means of a return spring 72. The mechanical system for the rear or all four wheel brakes is connected to the pin 73 and arm 65 through a coupling 74. This coupling has a rod or plunger 75 extended therefrom and slidable in a drilled hole 76a in the end of a rod 76. Nuts 77 are adjustable along the threaded portion 78 of the rod 75, these nuts forming an abutment similar in function to the abutment 37 and engageable with the end of the rod 76 after predetermined lost motion. The rod is pivotally connected at 79 to an equalizer 80 which in turn has two connections 81 with the brake actuating cams 41 of the rear wheels. The connection 82 to the equalizer may be from the hand lever 36 for independently operating the rear wheel brakes mechanically through cams 41. It will be understood that the remaining parts of the mechanical and hydraulic systems other than shown in Fig. 10 may correspond substantially to the mechanism previously described, including the structure of Figs. 4 and 5.

Thus, as explained in connection with Figs. 8 and 9, during the initial travel of pedal 61 to the dotted line position at "x", the rod 75 has a lost motion within the bore 76a. During this period hydraulic braking action proceeds and the mechanical system controlled by rod 76 and including cam 41 remains idle. Hence the clearance spaces 60 increase in magnitude during this interval. When the pedal reaches position "x" the abutment nut 77 engages the end of rod 76, and hence the mechanical system is actuated during the remainder of the pedal travel. The cam 41 in this case is designed so as to afford a more rapid build-up of the mechanical system. When the pedal reaches position "Y" the control of the braking action is taken over by the mechanical system, this position of the pedal being represented by point C' on the graph of Fig. 8.

I claim:

1. In a brake system for vehicle wheel brakes, hydraulic mechanism for applying the brakes, separate mechanical mechanism for applying the brakes, said mechanisms being interconnected for simultaneous operation, a single control device for said mechanisms, means for initially delaying the effective brake applying action of the mechanical mechanism whereby the braking action will be controlled solely by the hydraulic mechanism during a predetermined time, and means for accelerating the rate of action of the mechanical mechanism relatively to the hydraulic mechanism.

2. In a brake system for vehicle wheel brakes, hydraulically actuated mechanism for applying the brakes, separate mechanically actuated mechanism for applying said brakes, a single control device for said mechanisms, and means for initially delaying the effective brake applying action of the mechanically actuated mechanism whereby the braking action will be controlled by the hydraulically actuated mechanism during a predetermined time, said means including a pair of relatively slidable members providing a lost motion connection between said device and said mechanically actuated mechanism.

3. In a brake system for vehicle wheel brakes, hydraulically actuated mechanism for applying the brakes, mechanically actuated mechanism for applying said brakes, and a control device for operating both mechanisms, the former in advance of the latter, there being a lost motion connection between said device and said mechanically actuated mechanism comprising a pair of relatively slidable telescoped members.

4. In a brake system for vehicle wheel brakes, hydraulic mechanism for operating said brakes, mechanical mechanism for independently operating said brakes, a movable member for simultaneously operating both mechanisms, there being an initial lag between the commencement of brake application by the mechanical mechanism and the commencement of brake application by the hydraulic mechanism, and means whereby said lag diminishes during the range of brake application to cause simultaneous operation of said mechanisms at a predetermined time to apply the brakes.

5. In a brake system for vehicle wheel brakes, hydraulic mechanism for applying said brakes, mechanical mechanism for independently applying said brakes, a movable member for simultaneously operating both mechanisms, a lost motion connection in said mechanical mechanism intermediate said operating member and brakes rendering the initial movement of the operating member to apply the brakes effective only through said hydraulic mechanism, and means for disproportionately increasing the effective brake applying action of the mechanical mechanism with respect to the hydraulic mechanism.

6. In a brake system for vehicle wheel brakes, a hydraulically operated device for applying said brakes, a mechanically operated device for independently applying said brakes, a control member for simultaneously operating said devices, means whereby said control member normally operates during a predetermined time to apply the brakes only through the hydraulic device, and means for producing a differential brake applying action by said hydraulically and mechanically operated devices.

7. In a brake system for vehicle wheel brakes, a hydraulically operated device for applying said brakes, a mechanically operated device for independently applying said brakes, a control member for simultaneously operating said devices, means whereby said control member normally operates during a predetermined time to apply the brakes only through the hydraulic device, and means for disproportionately varying the effective brake applying action of the mechanically operated device with respect to the hydraulically operated device.

8. In a brake system for vehicle wheel brakes, hydraulically actuated mechanism for applying the brakes, separate mechanically actuated mechanism for applying said brakes, a single control device for said mechanism, and means for initially delaying the effective brake applying action of the mechanically actuated mechanism whereby the braking action will be controlled by the hydraulically actuated mechanism during a predetermined time, said means including a lost motion connection between said device and said mechanically actuated mechanism comprising a pair of relatively slidable telescoped members.

9. In a brake system for vehicle wheel brakes, hydraulically actuated mechanism for applying the brakes, mechanically actuated mechanism for applying said brakes, a control device for operating both mechanisms, the former in advance of the latter, there being a lost motion connection between said device and said mechanically actuated mechanism comprising a pair of relatively slidable telescoped members, and means carried by one of said members for varying the lost motion between said members.

10. In a brake system for vehicle wheel brakes, hydraulically actuated mechanism for applying the brakes, separate mechanically actuated mechanism for applying said brakes, a single control pedal, an operating member actuated by said pedal, means connected to said operating member for operating said hydraulically actuated mechanism, separate means for operating said mechanically actuated mechanism, and a delayed action connection between said operating member and said last named means comprising relatively movable parts for delaying actuation of said last named means during a predetermined initial operation of said operating member and first named means upon movement of the pedal to apply the brakes.

11. In a brake system for vehicle wheel brakes, hydraulically actuated mechanism for applying the brakes, separate mechanically actuated mechanism for applying said brakes, a single control pedal, an operating member actuated by said pedal, means connected to said operating member for operating said hydraulically actuated mechanism, separate means for operating said mechanically actuated mechanism, and a delayed action connection between said operating member and said last named means comprising relatively rotatable parts for delaying actuation of said last named means during a predetermined initial operation of said operating member and first named means upon movement of the pedal to apply the brakes.

12. In a brake system for vehicle wheel brakes, hydraulically actuated mechanism for applying the brakes, separate mechanically actuated mechanism for applying said brakes, a single control pedal, an operating member actuated by said pedal, means connected to said operating member for operating said hydraulically actuated mechanism, separate means for operating said mechanically actuated mechanism, and a delayed action connection between said operating member and said last named means comprising relatively slidable telescoped parts for delaying actuation of said last named means during a predetermined initial operation of said operating member and first named means upon movement of the pedal to apply the brakes.

13. In a brake system for vehicle wheel brakes, hydraulically actuated mechanism for applying the brakes, separate mechanically actuated mechanism for applying said brakes, a single control pedal, an operating member actuated by said pedal, means connected to said operating member for operating said hydraulically actuated mechanism, separate means for operating said mechanically actuated mechanism, a delayed action connection between said operating member and said last named means comprising relatively slidable telescoped parts for delaying actuation of said last named means during a predetermined initial operation of said operating member and first named means upon movement of the pedal to apply the brakes, and means in said connection for varying said delayed action.

14. In a brake system for vehicle wheel brakes, hydraulically actuated mechanism for applying the brakes, separate mechanically actuated mechanism for applying said brakes, a single control pedal, an operating member actuated by said pedal, means including a hydraulic master cylinder and a movable piston therein for operating said hydraulically actuated mechanism, a positive connection between said means and operating member, separate means for operating said mechanically actuated mechanism, and a normally non-positive connection between said operating member and second named means effective to maintain the latter at rest during an initial movement of the operating member and then effective to positively shift said second named means simultaneously with said piston.

STUART G. BAITS.